(12) United States Patent
Schuster et al.

(10) Patent No.: US 8,040,622 B1
(45) Date of Patent: Oct. 18, 2011

(54) APPARATUS FOR COMPENSATING AN IMAGING LENS

(75) Inventors: Israel Schuster, Kiryat-Tivon (IL); Yehuda Solomon, Rishon Lezion (IL)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/774,005

(22) Filed: May 5, 2010

(51) Int. Cl.
*G02B 7/02* (2006.01)
*G03B 13/00* (2006.01)

(52) U.S. Cl. .................... 359/824; 396/97; 353/101

(58) Field of Classification Search .......... 359/820, 359/643, 676; 396/42, 79, 97, 430; 348/335, 348/345, 144, 655, E5.024, E5.04; 358/406, 358/474, 475, 487; 355/30, 44, 53, 27, 67, 355/77; 353/100, 101, 122; 374/121, 125, 374/129; 219/121.67, 121.75, 667
See application file for complete search history.

(56) References Cited

U.S. PATENT DOCUMENTS

| | | | |
|---|---|---|---|
| 5,137,349 A * | 8/1992 | Taniguchi et al. | 353/122 |
| 6,268,885 B1 * | 7/2001 | Ohta | 348/345 |
| 6,353,203 B1 * | 3/2002 | Hokodate et al. | 219/121.67 |
| 6,822,688 B2 * | 11/2004 | Ohta | 348/349 |
| 6,954,292 B2 * | 10/2005 | Inoue | 358/475 |
| 7,567,395 B2 * | 7/2009 | Yuan | 359/820 |
| 7,683,975 B2 * | 3/2010 | Kageyama | 349/33 |

* cited by examiner

*Primary Examiner* — Loha Ben
(74) *Attorney, Agent, or Firm* — Nelson Adrian Blish

(57) ABSTRACT

An imaging system (400) includes an imaging lens (116) prone to temperature changes which leads to changes in the imaging focus position of the imaging lens. A temperature sensor (404) configured to monitor the temperature of the imaging lens. An imaging lens adjustment element (120) attached to the imaging lens configured to adjust the setting of the imaging lens. A controller (104) configured to process temperature readings and adjust the position of the imaging lens by activating the imaging lens adjustment element.

7 Claims, 6 Drawing Sheets

US 8,040,622 B1

APPARATUS FOR COMPENSATING AN IMAGING LENS

CROSS REFERENCE TO RELATED APPLICATIONS

Reference is made to commonly-assigned copending U.S. patent application Ser. No. 12/774,017, filed May 5, 2010, entitled A METHOD FOR CHANGING FOCUS POSITION OF A LENS, by Israel Schuster, the disclosure of which is incorporated herein.

FIELD OF THE INVENTION

This present invention relates to an imaging head for a laser processing system and more specifically to adjusting an imaging lens component within an imaging head.

BACKGROUND OF THE INVENTION

Laser imaging system 100, shown in FIG. 1, typically includes a light source 108 which emits light which is focused on an imaging media 124. The light passes through imaging lens 116, and is focused on specific areas of the surface of the imaging media 124. The imaging lens 116 may comprise a single lens element or may be a compound imaging lens 116 comprising a plurality of lens elements.

Although the glass components forming imaging lens 116 are transparent, the light absorption by the lens is not zero. In cases where the light source 108 is a laser and emits high energy, the energy absorption in imaging lens 116 is significant, and it increases the temperature of the glass components, creating a thermal gradient within the imaging lens components. This temperature variation causes a change in the optical behavior due to variations in size, shape, and index of refraction. Each one of these changes or a combination of them may cause a shift in the image position, yielding a shift in imaging lens 116 focus. The change in focus introduces image artifacts on the imaged imaging media 124.

SUMMARY OF THE INVENTION

Briefly, according to one aspect of the present invention, an imaging system is presented. The imaging system includes, an imaging lens which is prone to temperature changes leading to change in the imaging focus position of the imaging lens.

The system further includes a temperature sensor configured to monitor the temperature of the imaging lens. An imaging lens adjustment element attached to the imaging lens is configured to adjust the setting of the imaging lens. A controller is configured to process temperature readings and adjust the position of the imaging lens by activating the imaging lens adjustment element.

These and other objects, features, and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

Figure 1:
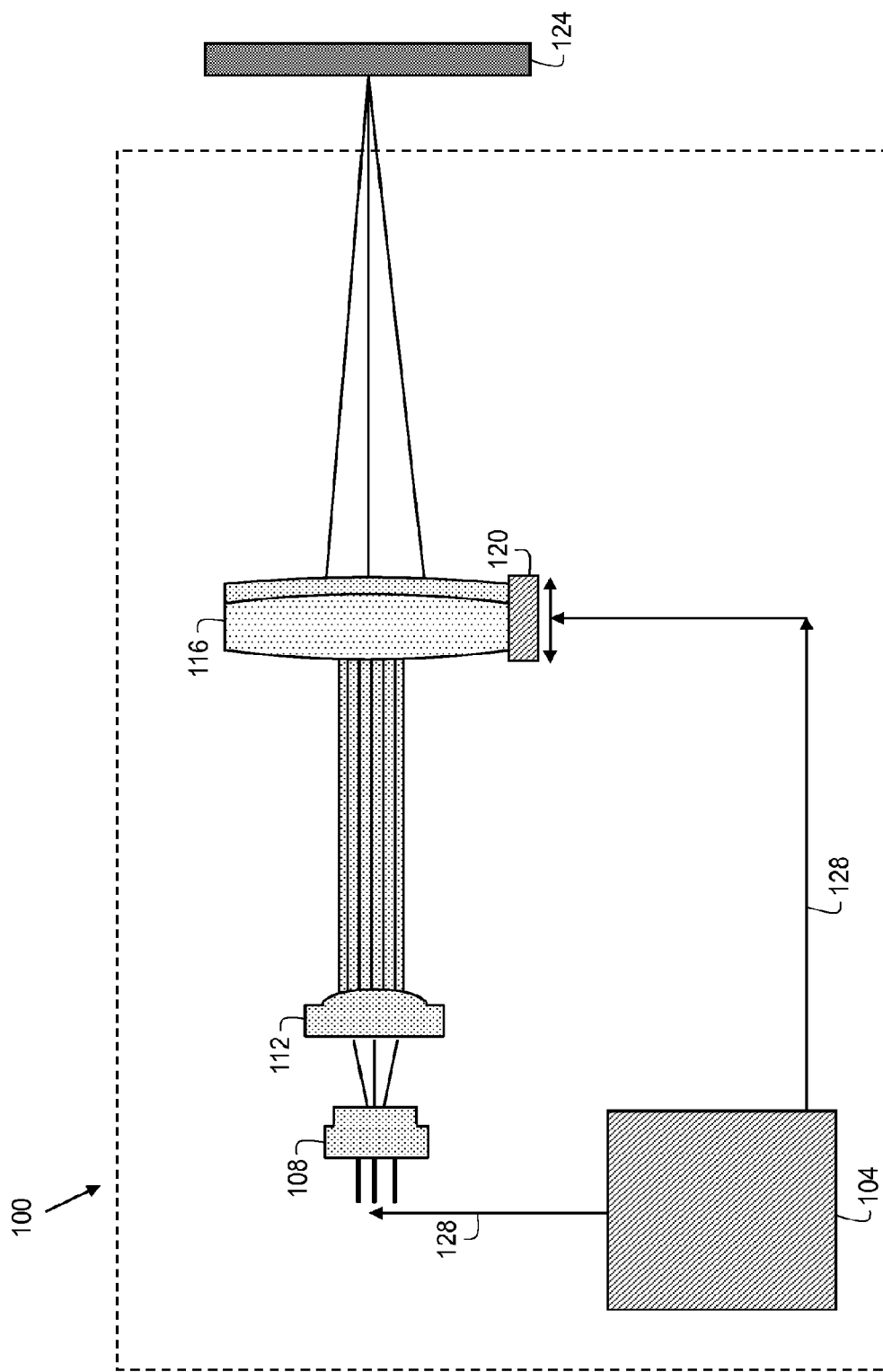
FIG. 1 is a schematic showing a prior art laser processing system.
Figure 2:
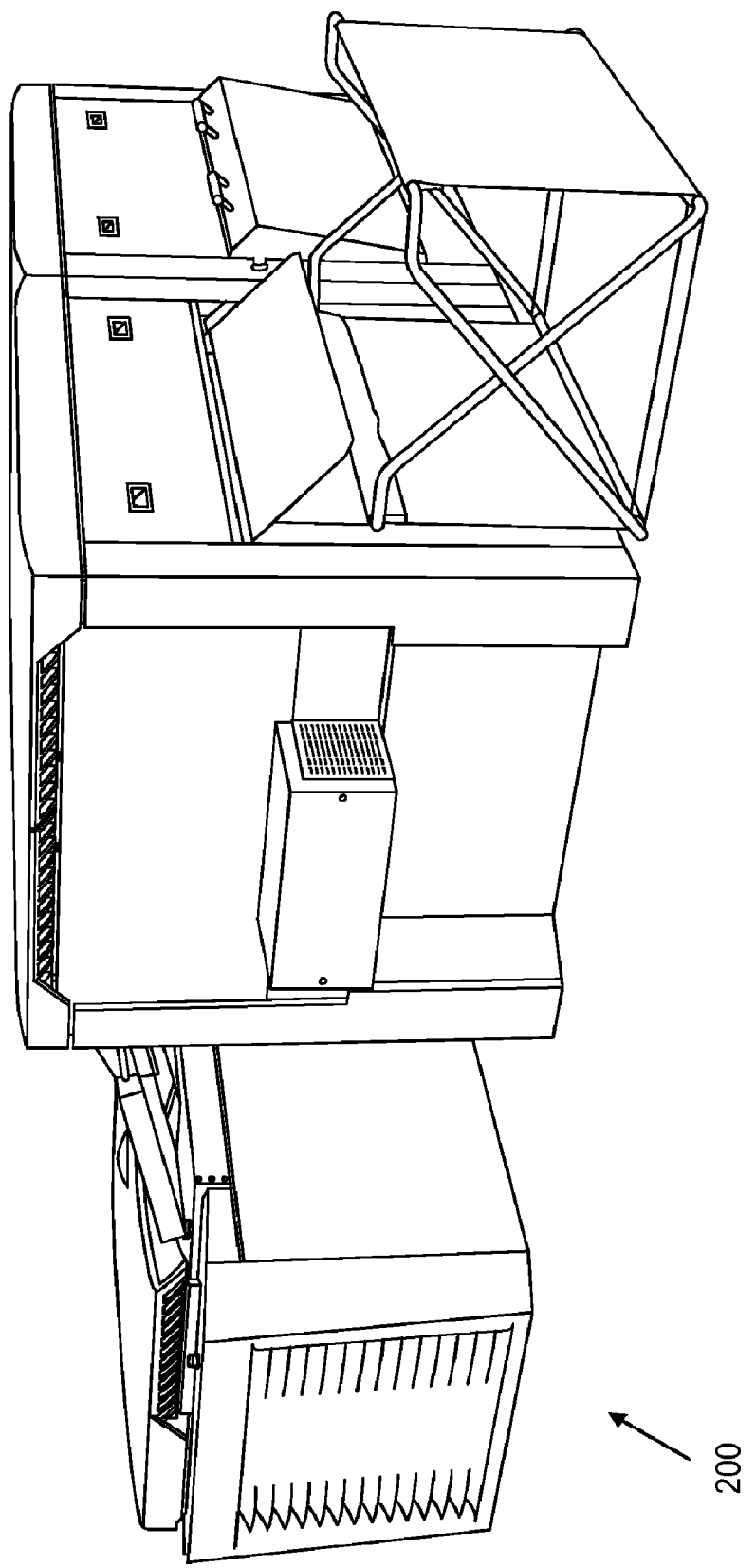
FIG. 2 is a schematic showing a prior art computer-to-plate (CTP) system for reference.

The present invention describes an adjustment apparatus and method for an imaging lens component operated in an imaging head of a laser processing system of a CTP imaging device 200 shown in FIG. 2.

Figure 3:
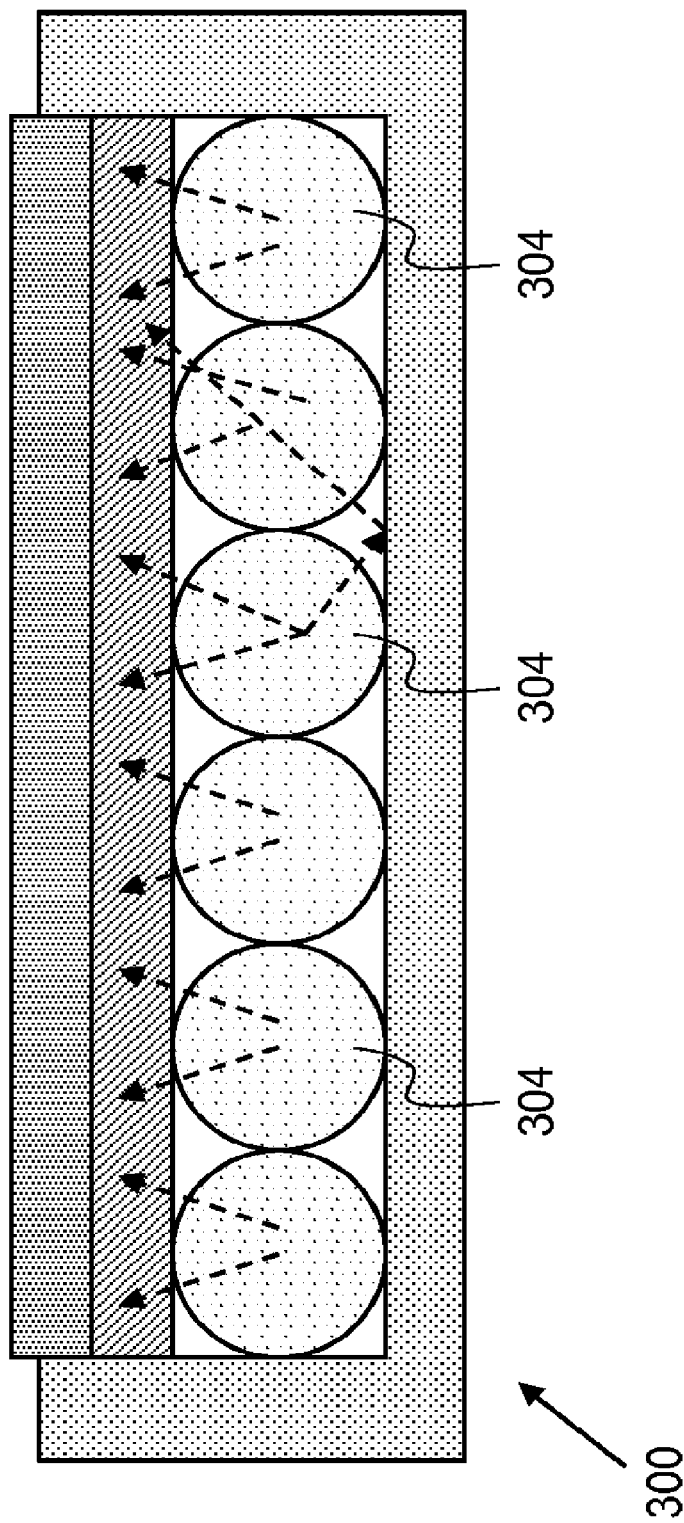
FIG. 3 is a schematic of a prior art laser diode array.

FIG. 2 shows a computer-to-plate (CTP) imaging device 200 equipped with a laser imaging system. The imaging device 200 is adapted to image printing plates 512 (shown in FIG. 5). The CTP imaging device employs high power imaging sources such as array of laser diodes 300 as shown in FIG. 3. The array is constructed from a plurality of fiber coupled laser diodes 304 that may emit as much as 1 kW and more.

In addition to CTP imaging devices, the present invention may be used in any machine designed for laser assisted material processing. It can also be used in any optical setup that is expected to operate in variable temperatures. The variable temperature can be either due to external factors or due to its operation.

Figure 4:
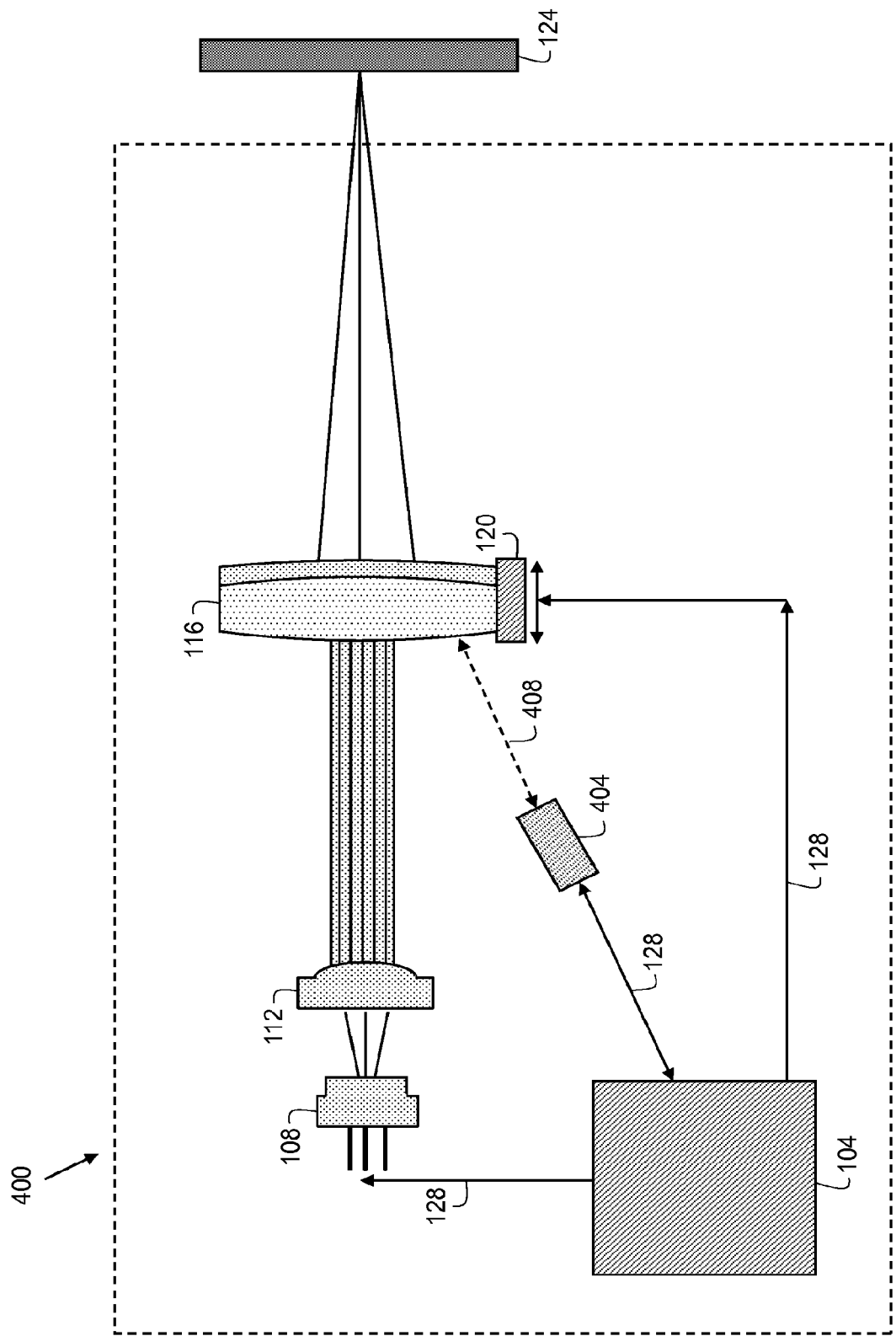
FIG. 4 is a schematic of a lens imaging system adjusted to compensate for thermal readings from the lens wherein the temperature sensor is not in contact with the lens.

FIG. 4 shows an imaging system 400. In operation, controller 104 supplies data to be imaged on imaging media 124 to an imaging light source 108, typically built from an array of laser diodes 300. Light source 108 is adapted to image on imaging media 124 via a lens system (112, 116). When the light is transmitted through a lens (112, 116), although the glass components are transparent, the light absorption is not zero.

Due to the high power transmitted by the imaging device through the imaging lens 116, the energy absorption is significant and increases the temperature of the glass components, creating a thermal gradient within the imaging lens components. This temperature variation causes a change in the optical behavior due to variations in size, shape, and index of refraction. Each one of these changes or a combination of them may cause a shift in the image position, yielding a shift in imaging lens 116 focus. The change in focus might introduce image artifacts on the imaged imaging media 124.

The present invention prevents or at least minimizes such artifacts. A thermal sensor 404 monitors the surface of at least one of the glass elements of imaging lens 116. By measuring the temperature of the surface, controller 104 receives the temperature readings via control lines 128 from thermal sensor 404. Controller 104 calibrates the readings to compensate for focus shift, and thus signals imaging lens adjustment element 120 through control lines 128 to compensate for the thermal focus shift by moving the position of imaging lens 116, or part of it, with respect to the optical path.

Figure 6:
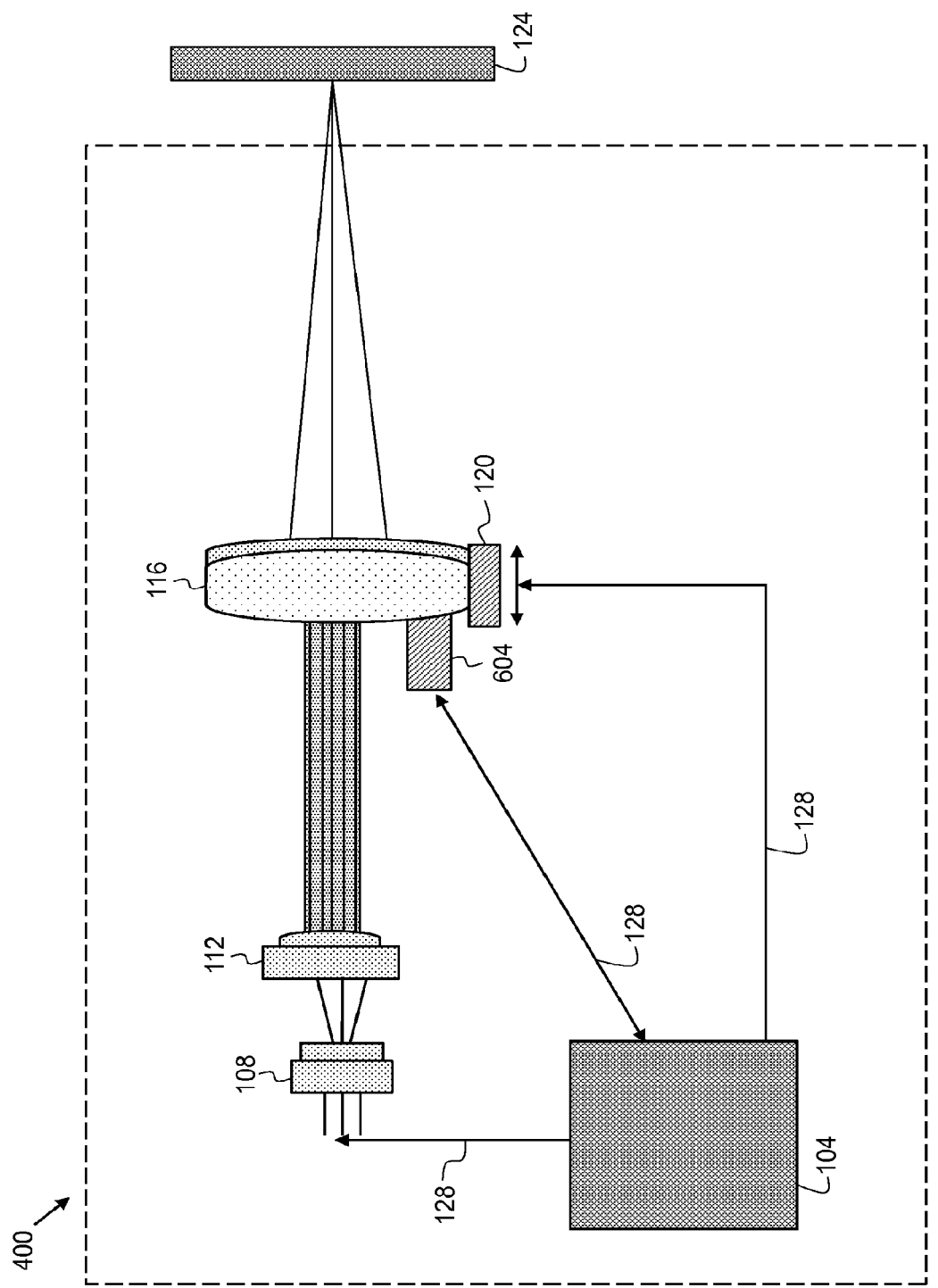
FIG. 6 is a schematic of a lens imaging system adjusted to compensate for thermal readings from the lens wherein the temperature sensor is in contact with the lens.

FIG. 6 shows a thermal sensor 604 which is in contact with lens 116. The preferred embodiment of this invention used a non-contact thermal sensor such as thermal sensor 404 shown in FIG. 4. Thermal sensor 404 detects infrared emission 408 from imaging lens 116. The level of the detected infrared emission 408 generated from imaging lens 116 indicates the temperature in proximity to imaging lens 116.

Figure 5:
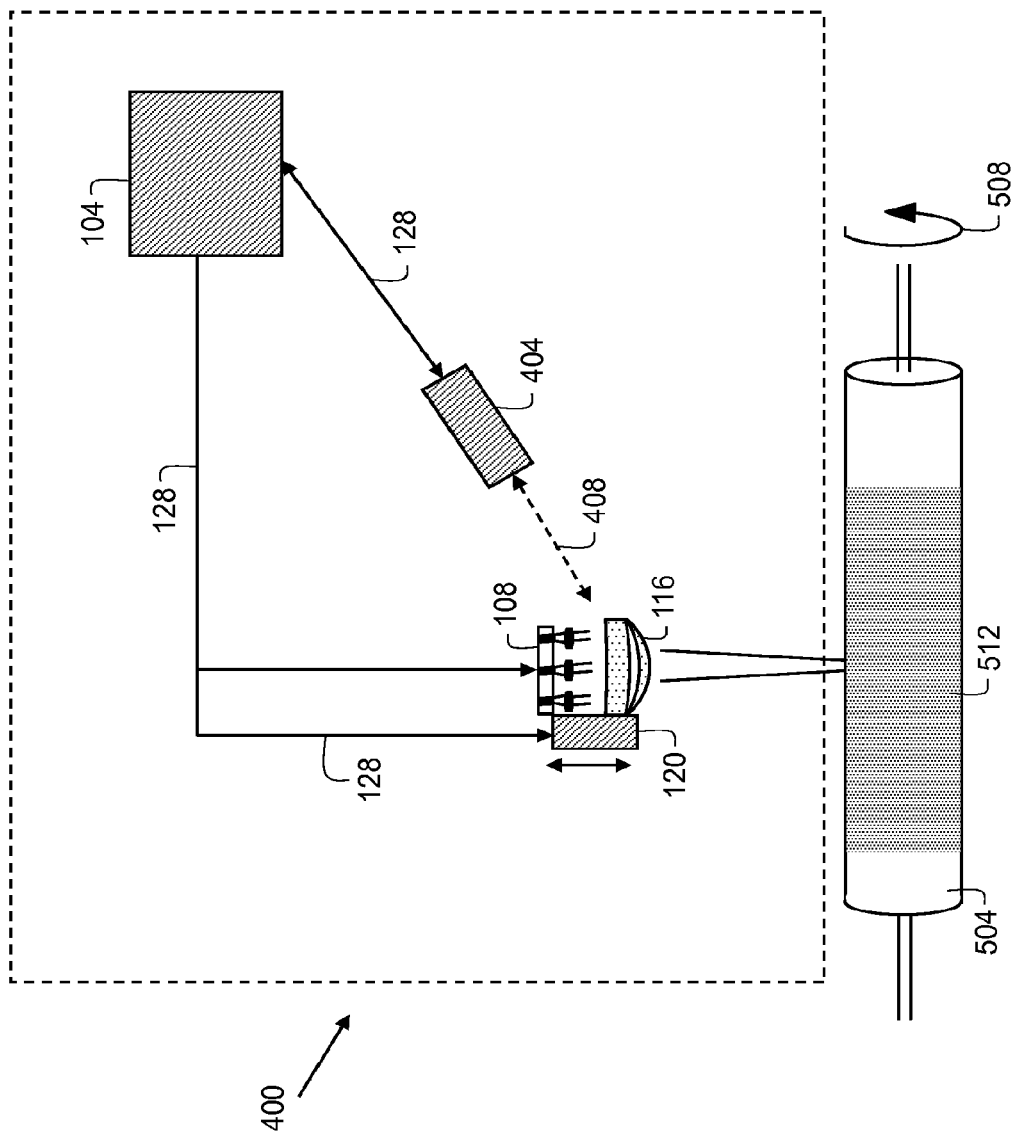
FIG. 5 is a schematic of a lens imaging system adjusted to compensate for thermal readings from the lens in a CTP environment.

FIG. 5 shows a laser processing system 400 in a CTP imaging device 200. A printing plate 512, which is mounted on a rotating drum 504, is imaged with imaging light source 108 through imaging lens 116. Drum 504 rotation direction 508 is in the direction shown. Compensation for temperature changes in the lens is the same as described above.

The invention has been described in detail with particular reference to certain preferred embodiments thereof, but it will be understood that variations and modifications can be effected within the scope of the invention.

PARTS LIST

| | |
|---|---|
| 100 | laser imaging system (laser processing system) |
| 104 | controller |
| 108 | light source |
| 112 | collimation lens |
| 116 | imaging lens |
| 120 | imaging lens adjustment element |
| 124 | imaging media |
| 128 | control lines |
| 200 | computer-to-plate (CTP) system |
| 300 | array of laser diodes |
| 304 | laser diodes in array 200 |
| 400 | imaging system with thermal adjustable imaging lens |
| 404 | thermal sensor |
| 408 | infrared emission |
| 504 | CTP drum |
| 508 | drum rotation direction |
| 512 | printing plate |
| 604 | thermal sensor in contact with lens |

The invention claimed is:

1. An imaging system comprising:
   an imaging lens;
   a temperature sensor for monitoring a temperature of a surface of said imaging lens;
   an imaging lens adjustment element attached to said imaging lens for adjusting a focus position of said imaging lens; and
   a controller for calibrating temperature readings of said imaging lens to compensate for focus shift thereof and activating said imaging lens adjustment element to adjust the focus position of said imaging lens based on temperature readings from said temperature sensor.

2. The imaging system according to claim 1 wherein said temperature sensor is a contact sensor attached to said imaging lens.

3. The imaging system according to claim 1 wherein said temperature sensor is a remote sensor.

4. The imaging system according to claim 3 wherein said temperature sensor detects infra red emission from said imaging lens.

5. The imaging system according to claim 1 wherein said imaging lens is a compound lens comprising more than one lens element.

6. The imaging system according to claim 5 wherein said adjustment element is configured to change the position of the compound lens.

7. The imaging system according to claim 5 wherein said adjustment element is configured to change the position of at least one lens element of said compound lens.

* * * * *